Aug. 29, 1961  E. C. RUST, JR  2,997,888
ADJUSTABLE INTERMITTENT FEED MECHANISM
Filed April 16, 1958
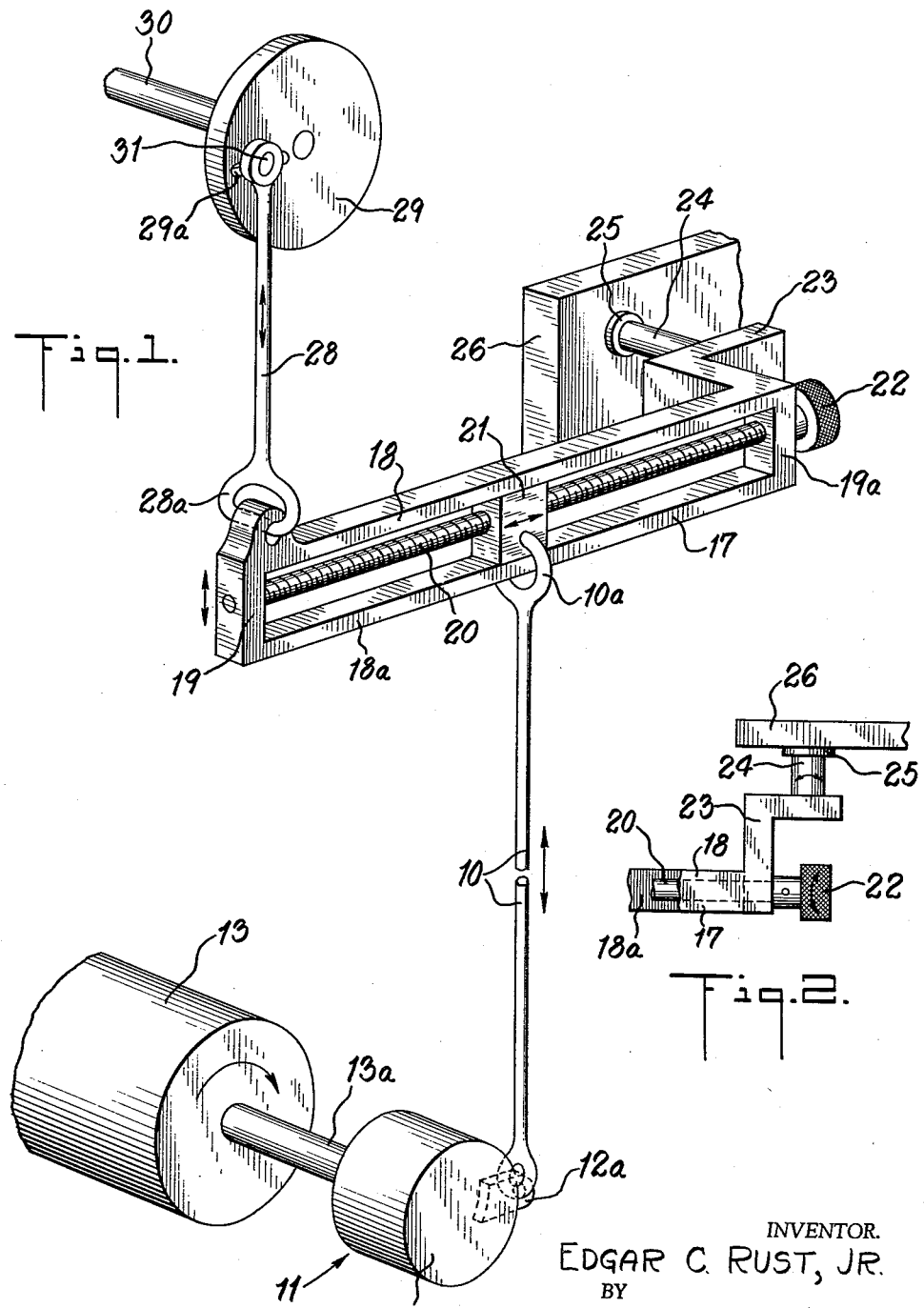
INVENTOR.
EDGAR C. RUST, JR.
BY
Davis, Hoxie & Faithfull
ATTORNEYS ന
United States Patent Office 2,997,888
Patented Aug. 29, 1961

2,997,888
ADJUSTABLE INTERMITTENT FEED MECHANISM
Edgar C. Rust, Jr., Williamstown, Mass., assignor to James Hunter Machine Company, North Adams, Mass., a corporation of Massachusetts
Filed Apr. 16, 1958, Ser. No. 728,918
2 Claims. (Cl. 74—119)

This invention relates to intermittent feed mechanisms of the type having an oscillating feed member, the oscillation amplitude of which determines the extent of each intermittent feeding motion. The invention has particular reference to an improved mechanism of this type in which the oscillation amplitude of the feed member may be varied while the feed mechanism is operating.

According to the invention, the oscillating feed member, which may be referred to as an output element, is driven from a lever which is swung back and forth about a pivotal axis by an oscillating driving member connected to the lever and which may be referred to as an input element. A screw is rotatably mounted on the lever and extends lengthwise of the lever from its pivotal axis. A block is threaded on the screw and has sliding engagement with a part of the lever operable to prevent rotation of the block with the screw. Thus, rotation of the screw adjusts the distance between the pivot axis of the lever and the block on the screw. The adjustable block is connected to one of the input and output elements, the other of which is connected to the lever at a fixed point, whereby the oscillating amplitude of the output element (feed member) may be varied by simply rotating the screw to adjust the position of the block along the lever. An adjustment member is connected to the screw for rotating it and is located substantially on the pivotal axis of the lever, so that adjustment of the oscillation amplitude of the feed member can be made while the feed mechanism is in operation.

In the preferred construction, the input element for swinging the lever is oscillated by an adjustable eccentric. Consequently, a coarse adjustment of the length of the feed movements may be made by adjusting this eccentric, after which a fine adjustment may be made by operation of the screw adjustment member on the lever during operation of the mechanism.

For a better understanding of the invention, reference may be had to the accompanying drawing, in which:

FIG. 1 is a perspective view of a preferred form of the new adjustable intermittent feed mechanism, and FIG. 2 is a plan view of part of the mechanism illustrated in FIG. 1, showing the pivoted end portion of the lever and the screw adjusting member.

In the drawing, the numeral 10 designates the oscillating or reciprocating feed rod of a feed mechanism shown generally at 11. This feed mechanism comprises a sprag or over-running clutch 12 mounted on the shaft 13a of a feed roller 13, which is journalled in any suitable manner. The clutch 12 has a laterally extending arm 12a pivotally connected to the lower end of feed rod 10. Thus, each downward stroke of feed rod 10 will cause the clutch 15 to rotate feed roller 13 in one direction through an angle dependent upon the length of the stroke; whereas each upward stroke allows the driving element of the clutch to slip back relative to the driven element of the clutch, so that there is no driving of the roller 13 in the opposite direction.

The feed rod 10 is reciprocated from a lever 17 having parallel longitudinal portions 18 and 18a spaced from each other by transverse ends 19 and 19a. In other words, the lever 17 forms in effect an open rectangular frame. Within this frame is a screw 20 extending lengthwise of the lever and having its opposite ends rotatably mounted in the transverse ends 19—19a, respectively, of the lever. A block 21 is threaded on the screw 20. This block has flat upper and lower surfaces which are in close sliding engagement with the flat inner surfaces of the upper and lower longitudinal portions 18 and 18a, respectively, of the lever 17. Consequently, each of these longitudinal portions constitutes a part of the lever operable to prevent rotation of the block 21 with the screw 20. This means that rotation of the screw will cause the block to travel in one direction or the other along the screw and the lever, depending upon the direction of rotation.

At one of its unthreaded ends, the screw 20 extends completely through its bearing in the lever end 19a and is connected to a rotatable adjustment member or knob 22 outside the lever frame. This same lever end 19a is rigidly connected to a bracket 23 having an integral stub shaft 24 extending at right angles to the lever. The shaft 24 forms a pivot which is rotatably mounted in a bearing 25 on a fixed support 26. As shown in FIGS. 1 and 2, the adjustment knob 22 is located substantially on the rotation axis of the pivot 24 on which lever 17 is adapted to swing.

The screw 20 extends between the pivot 24 and a driving rod 28 pivotally connected to the free end portion of the lever, as by means of a yoke 28a on the lower end of the driving rod. At its upper end, the rod 28 is connected to an adjustable eccentric comprising a disc 29 rotatable on a drive shaft 30. The disc 29 has a radial slot 29a which receives a pivot pin 31 by which the upper end of rod 28 is connected to disc 29. The pivot pin 31 may be secured by a releasable clamp (not shown) in any desired radial position in the slot 29a, so as to adjust the stroke length of the reciprocating drive rod 28.

By adjusting the eccentric 29—31 as described, it is possible to effect a coarse adjustment of the stroke length of feed rod 10. Then, after the feed mechanism has been started by rotation of drive shaft 30, the screw 20 may be rotated to effect a fine adjustment of this stroke length and therefore the extent of each intermittent feeding motion of roller 13. Such fine adjustment can be made during operation of the intermittent feed mechanism because of the location of adjustment knob 22. That is, since this adjustment knob is substantially on the pivotal axis of the lever 17, it undergoes only very slight movement as the lever is swung back and forth by the driving rod 28.

It will be apparent from the foregoing that the oscillating driving rod 28 constitutes an input element for swinging the lever 17 back and forth, while the oscillating feed rod 10 constitutes an output element whose oscillation amplitude is dependent upon the setting of the adjustable block 21. As previously mentioned, the block 21 is connected to one of the input and output elements 28 and 10, the other of these elements being connected to lever 17 at a fixed point. Thus, instead of the illustrated arrangement, the driving rod 28 could be connected at its lower end to the adjustable block 21, and the feed rod 10 connected at its upper end to the free outer end of lever 17. Alternatively, the input element could be connected directly to the shaft 24 to oscillate it and thereby swing the lever back and forth; or the input element could be connected to block 21 to swing the lever, and the shaft 24 connected to feed roller 13 through a clutch such as the sprag clutch 12. In any case, the oscillation amplitude of the output element can be adjusted closely by rotating the adjustment knob 22 while the mechanism is in operation.

I claim:
1. In an intermittent feed mechanism, the combination of a lever mounted for swinging back and forth about a pivotal axis, a screw rotatably mounted on the lever and extending lengthwise thereof from said axis, a block threaded on the screw and having sliding engagement with a part of the lever operable to prevent rotation of the block with the screw, whereby rotation of the screw moves the block along the lever relative to said axis, input and output elements one of which is connected to the block and the other of which is connected to the lever at a fixed point, said input element being an oscillating member operable to effect said swinging of the lever, whereby the output element is oscillated with an amplitude dependent upon the position of the block relative to said axis, a bracket rigidly secured to the lever and having a part offset laterally from the rotation axis of the screw, a pivot extending from one side of said bracket part and forming said pivotal axis of the lever, and an adjustment member forming a rigid axial extension of the screw and located on said pivotal axis but on the other side of said bracket part and in spaced relation thereto, whereby the adjustment member is operable to rotate the screw during said swinging of the lever.

2. The combination according to claim 1, comprising also an adjustable eccentric connected to said input element for oscillating the same, whereby coarse adjustment of said amplitude may be effected by adjustment of the eccentric.

References Cited in the file of this patent

UNITED STATES PATENTS

| | | |
|---|---|---|
| 14,576 | Sees | Apr. 1, 1856 |
| 1,045,582 | Messer | Nov. 26, 1912 |
| 1,258,668 | Gauntt | Mar. 12, 1918 |
| 1,296,637 | Draver | Mar. 11, 1919 |
| 1,769,566 | Goodrich | July 1, 1930 |
| 2,548,738 | Orlich et al. | Apr. 10, 1951 |
| 2,587,395 | Sheen | Feb. 26, 1952 |
| 2,841,997 | Maust | July 8, 1958 |

FOREIGN PATENTS

| | | |
|---|---|---|
| 39,193 | Sweden | July 10, 1914 |
| 381,106 | France | Oct. 29, 1907 |